UNITED STATES PATENT OFFICE.

JEROME B. GILBERT, OF KNOXVILLE, PENNSYLVANIA.

COMPOSITION OF MATTER.

1,068,999.  Specification of Letters Patent.  Patented July 29, 1913.

No Drawing.  Application filed April 5, 1912.  Serial No. 688,769.

*To all whom it may concern:*

Be it known that I, JEROME B. GILBERT, a citizen of the United States, and a resident of Knoxville, in the county of Tioga and State of Pennsylvania, have made certain new and useful Improvements in Compositions of Matter, of which the following is a specification.

My invention relates to improvements in composition of matter, more particularly compounds for the preservation of the soles of shoes, and it consists in the various ingredients hereinafter specified.

An object of my invention is to provide a composition of matter which prolongs the life of the shoes, and which can be made from inexpensive materials.

A further object of my invention is to provide a composition of matter which renders the leather waterproof without destroying its pliability.

A further object of my invention is to provide a compound which does not possess the ordinary offensive odors that are characteristic of leather preservatives.

Other objects and advantages will appear in the following specification and the novel features of the compound will appear in the appended claims.

In carrying out my invention, I make use of pulverized gum copal. By "gum copal", I do not mean the copal nibs which is an inferior grade of copal, much softer and is much more easily rendered soluble.

The copal after being powdered is put into linseed oil, and is heated until the gum fuses with the oil. This I will designate solution A. I then take gutta-percha, shave it up fine, and put it into another portion of linseed oil. This second portion is then heated so as to dissolve the rubber in the oil. This solution, I will designate solution B. After solution A is somewhat cooled, I add solution B, heat the mixture slightly and the two solutions will form a third solution C which is of a homogeneous nature throughout, and which is the final product. This product is heavier and darker than ordinary varnish. It has a slight odor, but not at all an offensive odor, such as is common with ordinary leather preservatives. Moreover the odor disappears shortly after applied.

While the preservative may be made of other proportions without departing from the spirit of the invention, I prefer to make it as follows: For solution A, I dissolve eight ounces of gum copal in twenty ounces of linseed oil. For solution B, I dissolve one ounce of gutta-percha in twenty ounces of linseed oil. The mixture may be applied with a brush or other suitable means, and is absorbed by the leather so that it completely fills the pores. The leather may then be left over night when the surface of the leather will be found to be waterproof and the sole of the shoe will be greatly improved in its wearing qualities. In this connection I desire to state that the use of the linseed oil and gutta-percha is far more efficient than an alcoholic solution of copal since the spirit tends to evaporate quickly, leaving the copal deposited on the surface, but not in the pores. I therefore do not claim a copal varnish broadly.

What I claim is:

1. A composition of matter for treating leather consisting of a solution of gutta-percha and gum copal in linseed oil.

2. A composition of matter for treating leather consisting of a solution composed of eight parts by weight of gum copal, one part of gutta percha, and forty parts of linseed oil.

JEROME B. GILBERT.

Witnesses:
S. J. SEACORD,
F. O. BECK.

Copies of this patent may be obtained for five cents each, by addressing the "Commissioner of Patents, Washington, D. C."